(12) United States Patent
Araujo et al.

(10) Patent No.: US 11,562,086 B2
(45) Date of Patent: Jan. 24, 2023

(54) FILESYSTEM VIEW SEPARATION FOR DATA CONFIDENTIALITY AND INTEGRITY USING LATTICE-BASED SECURITY DOMAINS

(71) Applicant: International Business Machines Corporation, Armonk, NY (US)

(72) Inventors: Frederico Araujo, White Plains, NY (US); Marc Phillipe Stoecklin, White Plains, NY (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 16/019,793

(22) Filed: Jun. 27, 2018

(65) Prior Publication Data
US 2020/0004977 A1 Jan. 2, 2020

(51) Int. Cl.
*G06F 21/62* (2013.01)
*G06F 21/57* (2013.01)
*H04L 67/30* (2022.01)
*G06F 21/53* (2013.01)
*G06F 16/185* (2019.01)
*G06F 16/17* (2019.01)

(52) U.S. Cl.
CPC ...... *G06F 21/6218* (2013.01); *G06F 16/1734* (2019.01); *G06F 16/185* (2019.01); *G06F 21/53* (2013.01); *G06F 21/57* (2013.01); *H04L 67/30* (2013.01)

(58) Field of Classification Search
USPC ......................................................... 713/165
See application file for complete search history.

(56) References Cited

U.S. PATENT DOCUMENTS

| | | | |
|---|---|---|---|
| 7,197,516 B1* | 3/2007 | Hipp | G06F 16/10 |
| 7,962,426 B2* | 6/2011 | Pall | G06Q 10/10 |
| | | | 706/11 |
| 8,108,926 B2* | 1/2012 | Haller | G06Q 10/10 |
| | | | 713/182 |

(Continued)

OTHER PUBLICATIONS

Kharraz, et al., "UNVEIL: A Large-Scale, Automated Approach to Detecting Ransomware," 25th USENIX Security Symposium, Aug. 2016.
Scaife, et al., "Cryptolock (and drop it): Stopping ransomware attacks on user data," 2016 IEEE 36th International Conference on Distributed Computing Systems, 2016.

(Continued)

*Primary Examiner* — Amare F Tabor
(74) *Attorney, Agent, or Firm* — Jeffrey S. LaBaw; David H. Judson

(57) ABSTRACT

A stackable filesystem architecture that curtails data theft and ensures file integrity protection. In this architecture, processes are grouped into ranked filesystem views, or "security domains." Preferably, an order theory algorithm is utilized to determine a proper domain in which an application is run. In particular, a root domain provides a single view of the filesystem enabling transparent filesystem operations. Each security domain transparently creates multiple levels of stacking to protect the base filesystem, and to monitor file accesses without incurring significant performance overhead. By combining its layered architecture with view separation via security domains, the filesystem maintains data integrity and confidentiality.

21 Claims, 9 Drawing Sheets

(56) References Cited

U.S. PATENT DOCUMENTS

| | | | | |
|---|---|---|---|---|
| 8,112,392 | B1* | 2/2012 | Bunnell | G06F 16/188 |
| | | | | 707/625 |
| 8,332,441 | B2* | 12/2012 | Aurora | G06F 16/188 |
| | | | | 707/821 |
| 8,843,997 | B1* | 9/2014 | Hare | H04L 63/0281 |
| | | | | 709/200 |
| 9,075,638 | B2* | 7/2015 | Barnett | G06F 9/455 |
| 10,073,956 | B2* | 9/2018 | Lilko | G06F 21/604 |
| 10,417,431 | B2* | 9/2019 | Chaganti | G06F 9/5077 |
| 2005/0004886 | A1* | 1/2005 | Stahl | G06F 21/566 |
| 2005/0246770 | A1 | 11/2005 | Hunt et al. | |
| 2005/0273858 | A1 | 12/2005 | Zadok et al. | |
| 2009/0030935 | A1 | 1/2009 | Kurichiyath et al. | |
| 2015/0067399 | A1* | 3/2015 | Jaroker | G06F 11/261 |
| | | | | 714/37 |
| 2015/0237124 | A1 | 8/2015 | Balachandran et al. | |
| 2016/0170773 | A1* | 6/2016 | Franck | H04L 41/0806 |
| | | | | 713/2 |
| 2018/0069707 | A1 | 3/2018 | Loreskar et al. | |
| 2018/0232450 | A1* | 8/2018 | Bivens | G06F 16/24578 |

OTHER PUBLICATIONS

Kolodenker, et al., "Paybreak: Defense against cryptographic ransomware," Proceedings ACM Sym. Information, Computer and Communications Security, 2017.

Linux Programmer's Manual: Namespaces, http://man7.org/linux/man-pages/man7/namespaces.7.html, 2017.

Continella, et al., "Shieldfs: A self-healing, ransomware-aware filesystem," ACSAC '16, Dec. 2016.

Kharraz, et al., "Redemption: Real-time protection against ransomware at end-hosts,".

Rutkowska, et al., Qubes os architecture v0.3, 2010.

* cited by examiner

ALGORITHM 1: CREATING THE PER-SUBJECT OVERLAY FILESYSTEM

```
1  unshare(NEW_NS);
2  config = getDcfsConfiguration();
3  mountDir = "/var/namespaces/ns1/rootfs";
4  makeDir(mountDir);
5  overlayMount = "/var/namespaces/ns1/overlay";
6  makeDir(overlay);
7  populateOverlay(overlayMount, config);
8  mount(mountDir, base="/", overlay=overlayMount);
9  innerMountDir = "/var/namespaces/ns1/oldroot";
10 makeDir(innerMountDir);
11 pivot_root(mountDir, innerMountDir);
12 unmount(innerMountDir);
13 removeDir(innerMountDir);
```

FIG. 8

FILESYSTEM VIEW SEPARATION FOR DATA CONFIDENTIALITY AND INTEGRITY USING LATTICE-BASED SECURITY DOMAINS

BACKGROUND

Technical Field

This disclosure relates generally to cyber security.

Background of the Related Art

Cybercrime has become a big money business with sensitive data being a hot commodity on the dark web. While several specialized filesystem mitigations have been proposed in response to the recent outbreak of ransomware attacks, these protections typically focus on preventing the execution of ransomware, maintaining system backups, or reverse engineering custom cryptography schemes. Unfortunately, however, such reactive approaches are inadequate and have not seen widespread adoption, as 71% of the organizations attacked by ransomware still have their files successfully encrypted, with less than half being able to recover from backups.

Known ransomware mitigation techniques include Paybreak, which allows ransomware to encrypt files on a system but also stores cryptographic keys (by hooking a Windows Crypto API) so that it can reverse the encryption. While working well against ransomware, this technique cannot defend against malware that deletes or corrupts data, or malware that uses its own crypto libraries. Another approach, UNVEIL, runs ransomware in a realistic sandbox environment, and it monitors disk access patterns to make a decision about whether a piece of software is indeed ransomware. This approach, however, does not provide host-level detection or protection. Yet another solution, Crypto-Drop, can detect ransomware on host machines using I/O based features, but it does not provide filesystem protections.

Qubes OS is an operating system that isolates applications through virtualization using the Xen hypervisor, where security domains can be set up to run groups of applications in separate virtual machines. These applications are then projected onto an administrative domain using XWindows. While providing maximum isolation, Qubes OS sacrifices usability, and it is not supported natively by commodity operating systems. Another proposed solution is ShieldFS, which is a copy-on-write filesystem that enforces a requirement that all processes must write to an overlay as protection until a detector determines (based on file I/O stats) that a process is not ransomware. Redemption is similar to ShieldFS except that it uses more features to detect ransomware behavior, including the entropy of data blocks, number of file writes, number of directory traversals, and number of file conversions. While these approaches also provide integrity guarantees against ransomware, they are unable to deal with other types of malware, nor do they deal with data confidentially and usability problems.

Other protective measures, such as deceptive files and canaries, alert defenders of an attacker's presence by leaving deceptive breadcrumbs among the legitimate files on a filesystem, which trigger a beacon when they are accessed by any user. To avoid confusing legitimate users, the users must either be aware of the decoys (which is difficult to maintain in shared systems), or the decoys must be identifiable (difficult to prevent attackers from also being able to identify decoys). Unfortunately, such deceptive files do not prevent the attacker from stealing sensitive data.

BRIEF SUMMARY

The approach herein provides a stackable filesystem architecture that curtails data theft and ensures file integrity protection. In this architecture, processes or applications preferably are grouped into ranked filesystem views (referred to herein as "security domains"). In the described approach, an order theory algorithm is utilized to determine a proper domain in which an application is run. In particular, a root domain provides a single view of the filesystem enabling transparent filesystem operations. Each security domain transparently creates multiple levels of stacking to protect the base filesystem, and to monitor file accesses without incurring significant performance overhead. By combining its layered architecture with view separation via security domains, the filesystem maintains data integrity and confidentiality. In addition, the filesystem stops malware from making system-level changes, such as persisting across reboots or creating hidden users, regardless of privilege.

According to a preferred filesystem model, each security domain is assigned a rank, namely, a trust level relative to the other security domains. The security domains are ordered, e.g., by trust scores or other attributes, to form a partially-ordered set lattice, preferably with an untrusted domain at a bottom of the lattice (denoting untrusted execution), and a root domain at the top of the lattice (denoting trusted execution). A target execution domain (for a new process or application) is determined, preferably by a kernel execution function that applies the order theory algorithm to the lattice. In particular, preferably the algorithm determines a meet (a greatest lower bound) with respect to a set of security domains involved in the security domain determination. These security domains include the set of security domains associated with a user, and a parent process security domain, which typically is denoted by a current mount namespace. By including the parent process security domain in the security domain determination of a newly-launched process, the execution of the new process is capped to its parent process's security domain, thus preventing lower-ranked domains from accidentally or maliciously spawning child processes in higher-ranked domains.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 8 depicts an algorithm for creating a per-subject overlay filesystem;

DETAILED DESCRIPTION OF AN ILLUSTRATIVE EMBODIMENT

Figure 1:
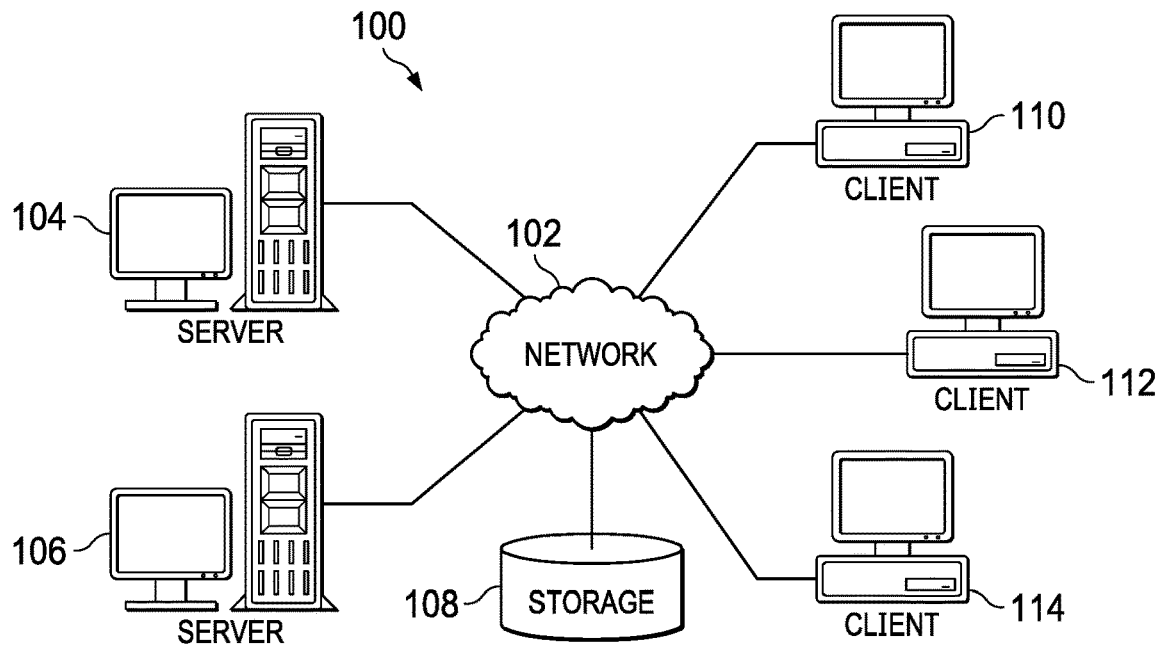
FIG. 1 depicts an exemplary block diagram of a distributed data processing environment in which exemplary aspects of the illustrative embodiments may be implemented.
Figure 2:
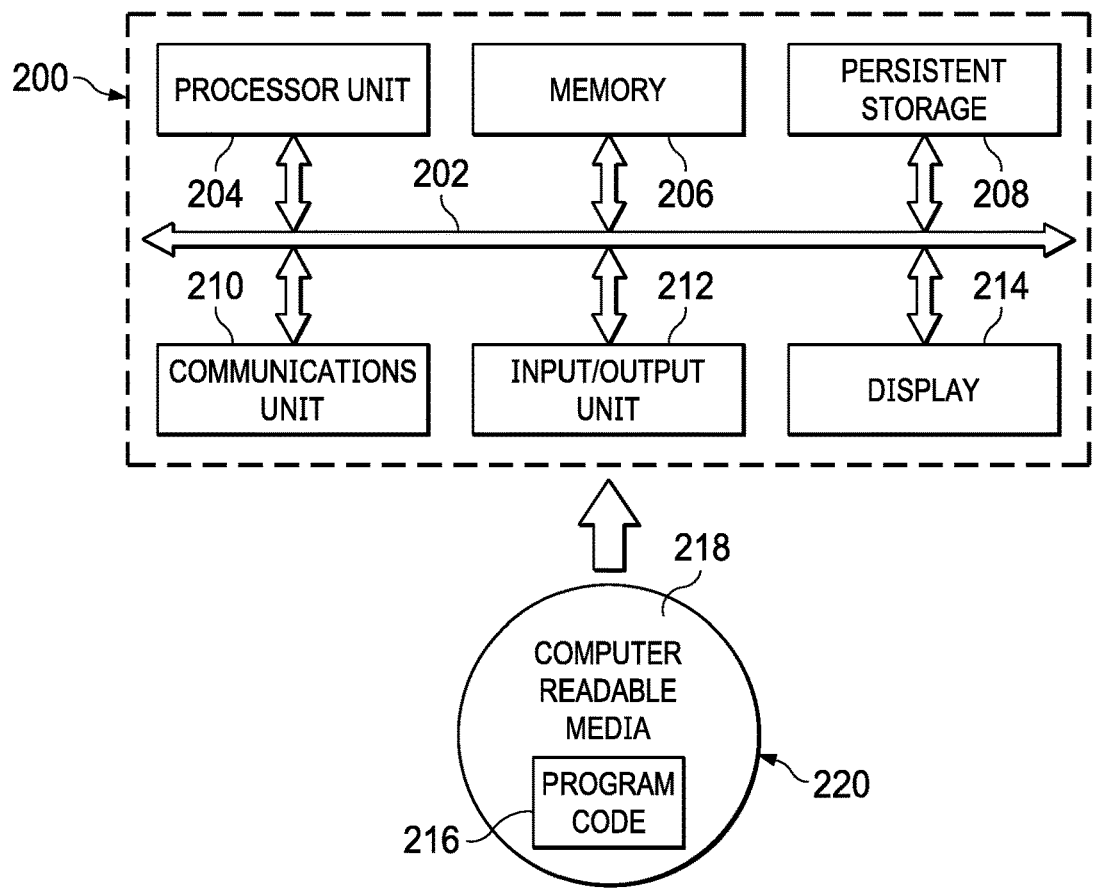
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 106. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 206, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 206 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 206 may take various forms depending on the particular implementation. For example, persistent storage 206 may contain one or more components or devices. For example, persistent storage 206 may be a hard drive, a flash memory, a rewritable optical disk, a rewritable magnetic tape, or some combination of the above. The media used by persistent storage 206 also may be removable. For example, a removable hard drive may be used for persistent storage 206.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 206. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 206.

Program code 216 is located in a functional form on computer-readable media 216 that is selectively removable and may be loaded onto or transferred to data processing system 200 for execution by processor unit 204. Program code 216 and computer-readable media 216 form computer program product 220 in these examples. In one example, computer-readable media 216 may be in a tangible form, such as, for example, an optical or magnetic disc that is inserted or placed into a drive or other device that is part of persistent storage 206 for transfer onto a storage device, such as a hard drive that is part of persistent storage 206. In a tangible form, computer-readable media 216 also may take the form of a persistent storage, such as a hard drive, a thumb drive, or a flash memory that is connected to data processing system 200. The tangible form of computer-readable media 216 is also referred to as computer-recordable storage media. In some instances, computer-recordable media 216 may not be removable.

Alternatively, program code 216 may be transferred to data processing system 200 from computer-readable media 216 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 206, and computer-readable media 216 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF).

By way of additional background, it is known that modern operating systems (including, without limitation, Linux) implement a feature known as "namespaces." A namespace isolates and virtualizes system resources for a collection of processes. In particular, namespaces are a kernel-level feature that wraps a global system resource into an abstraction, such that the process inside the namespace appears to have its own isolated instance of the global system resource. Processes inside a namespace are visible to others inside the same namespace, but they are opaque to processes outside the namespace. The Linux OS kernel provides seven (7) namespaces, each providing isolation for a different operating resource. Some examples of resources that can be virtualized include process IDs, hostnames, user IDs, and the like. One namespace, called cgroup, refers to the Linux kernel functionality called cgroups that allows limitation and prioritization of resources (CPU, memory, block I/O, network, etc.). Another namespace, called mount, refers to the filesystem mount points seen by a process.

It is also known to provide so-called "container" technology that combines the operating system kernel's support of cgroups and namespaces to provide isolated execution environments for applications. Thus, for example, where a host machine executes an operating system (OS), such as the Linux kernel, the operating system provides an OS-level virtualization method for running multiple isolated computing workloads (containers). Typically, a container in this environment hosts one or more applications. By providing a way to create and enter containers, the operating system gives applications the illusion of running on a separate machine while at the same time sharing many of the underlying resources.

Integrity, Theft Protection and Cyber Deception Using a Deception-Based Filesystem During a successful cyberattack, an adversary typically installs an application on the defender's system and/or exfiltrates private information. Both of these actions involve interactions with the exploited computer's filesystem. Attackers typically do not know the layout of such filesystems; therefore, they must investigate the various files on the system to identify interesting data to remove. The approach now described is designed to leverage this need by the attacker (to investigate files) to thereby detect malicious behavior and identify intruders. To this end, an existing base filesystem is augmented to transparently create one or more levels of stacking to protect the base filesystem and, in particular, by injecting decoy files, monitoring file accesses, and providing per-process views of the filesystem to confuse and identify potential attackers. This stacking provides a decoy filesystem that protects the underlying files in the base filesystem by hiding and redacting of sensitive files with baits, injecting decoys onto fake system "views" that are purveyed to untrusted subjects, and file access monitoring. This cyber deception is carried out while maintaining a pristine state of the filesystem with respect to legitimate processes.

Thus, instead of an approach that merely encourages attackers to reveal themselves (e.g., by interacting with the filesystem), the technique described below preferably embeds monitoring, decoy files creation, and file systems views separation directly into the filesystem rather than externally or through the files themselves. The resulting filesystem significantly curtails data theft and ensures file integrity protection.

Figure 3:
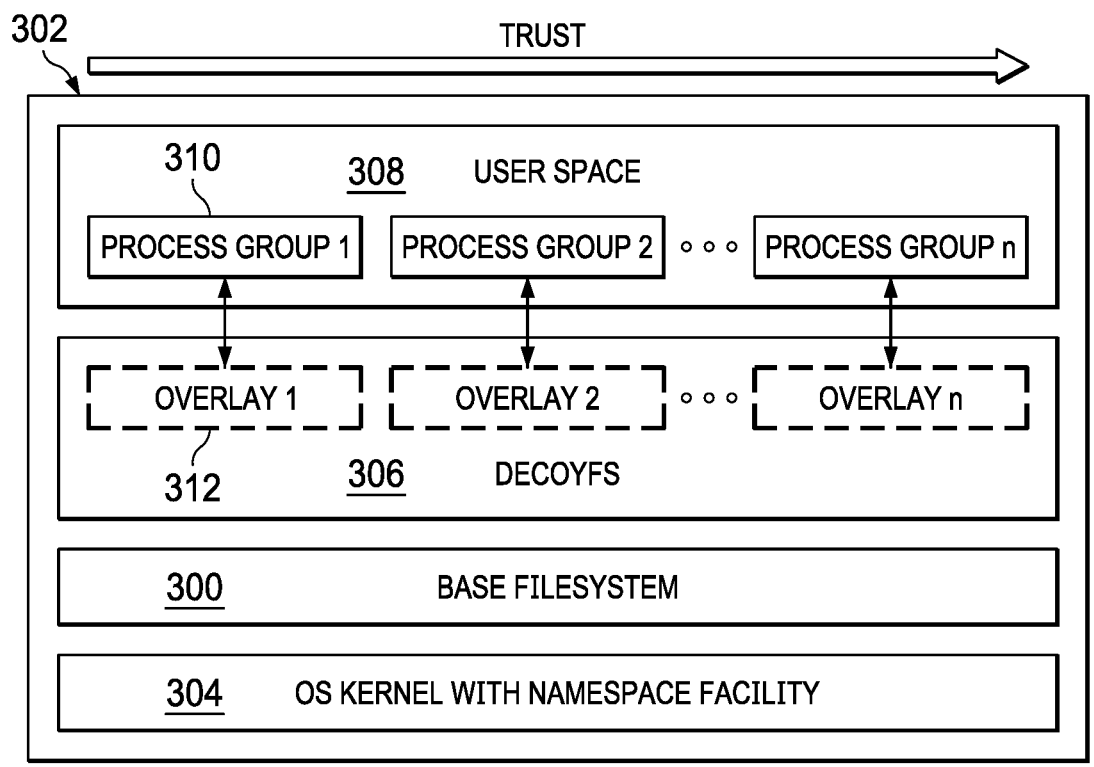
FIG. 3 depicts a decoy filesystem architecture of this disclosure.

FIG. 3 depicts the basic approach. The filesystem being protected is depicted as base filesystem 300, and this filesystem may be of any conventional type, e.g., block-based, network-based, etc. In this example implementation, the filesystem executes in a computing system 302, such as depicted in FIG. 2. The computer system 302 includes an operating system (OS) kernel 304 (e.g., the Linux kernel) that has support for containers and namespaces, such as previously described. According to this approach, a decoy filesystem 306 is configured between the base filesystem 300 and user space 308 in which processes in the process groups 310 execute. This architecture allows for different directory and file trees to be overlayed (i.e., superimposed) over the base filesystem 300. To this end, a set of filesystem overlays 312 are then preferably deployed on a per-process basis, providing each process with a different view of the filesystem. As also depicted, the degree of trust may vary (e.g., by increasing) across the overlays. Thus, "overlay 2" may be seen as more trusted than "overlay 1," etc.

Figure 4:
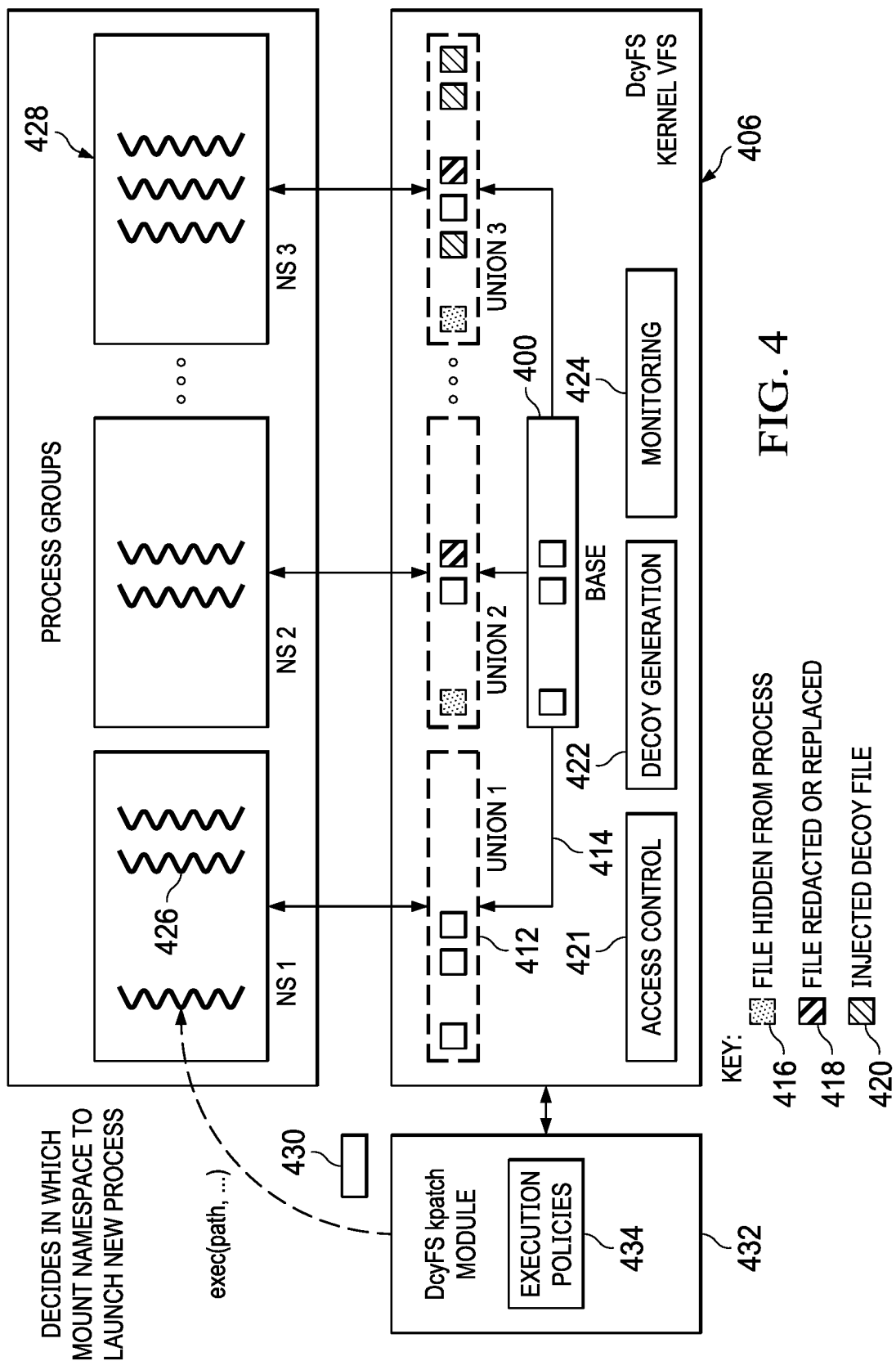
FIG. 4 depicts an implementation of the decoy filesystem using Linux operating system kernel mount namespaces.

FIG. 4 depicts an architectural overview of the decoy filesystem 406 in additional detail. As noted above, the approach configures a set of filesystem overlays 412 that are preferably deployed on a per-process basis, providing each process with a different view of the filesystem. As depicted, the base filesystem 400 is shown as comprising a set of base files 414, and these base files are mirrored in each of the overlays. Within an overlay, however, and as indicated by the key, a base file may be hidden from a process (represented by hidden file 416), or redacted or replaced (represented by replaced file 418). The key also indicates the notion of a decoy file 420 that may be injected into a particular overlay. As depicted, the "view" presented to a process in a particular overlay may vary and is computed as a "union" of the base filesystem 400 and the overlay 412. To alter the resulting union, and as noted, each overlay 412 thus has the ability to (1) hide base files, (2) modify the content of a base file by overlaying a different file (e.g., one that is redacted or replaced) with the same name, and (3) inject new decoy files that are not present in the host system. Further, file writes are stored in the overlay 412, thereby protecting base files 414 from being overwritten. This approach thus provides for a stackable filesystem that can be mounted atop different base filesystem types (e.g., block-, disk-, network-) to offer data integrity protection and enhanced detection against data-stealing attacks.

As also depicted, the decoy filesystem preferably includes an access control module 421, a decoy generation module 422, and a monitoring module 424. The access control module 421 controls access to the overlays 412 by the processes 426, which execute within one or more namespaces 428 configured in user space 408. The namespaces 428 are "mount" namespaces. The decoy generation module 422 generates encrypted files and implants the decoys in the overlay to replace sensitive files in the base filesystem. The monitoring module 424 transparently monitors and logs access to the files. Based on this monitoring, the system can determine whether a process 426 is trusted. Preferably, and then using the access control module 421, only an untrusted process is affected by the hidden and decoy files, leaving legitimate users free of confusion.

To effectively and securely construct filesystem overlays, the decoy filesystem 406 preferably leverages an operating system kernel mount namespace 428 and, in particular, to pivot the base filesystem in the namespace to a specially-crafted union mount. The mount namespace is a Linux operating system construct that provides an isolated mount point list for every process residing in a particular namespace; thus, a process inside the namespace observes a different filesystem than the base system. Processes are moved, upon creation, into a mount namespace, preferably based on some notion of trust. Preferably, a decoy filesystem kernel patch module is used for this purpose. In one embodiment, a simple trust model that may be used for this purpose is based on white/black listing. The trust model maps a user name, binary hash, or process name to a set of configurations describing an overlay. An alternative trust model approach, based on the notion of security domains, is described below.

Referring back to FIG. 4, preferably a configuration also specifies which files and directories to show in the overlay, which ones to hide, and which ones to replace with another file. Using the access control module 421, trusted processes are then presented with a pristine (unaltered) view of the filesystem.

In particular, and too achieve transparency and minimize performance overhead, a preferred Linux-based implementation leverages a kernel modification deployed as a kernel hot patch 430 (patching the kernel while it is running), and the installation of a kernel module 432 implementing the monitoring, access control, and decoy creation and injection capabilities. As depicted in FIG. 4, the hot patch 430 modifies the kernel's exec family of functions 434 to drop newly-created processes into a new mount namespace protected by the decoy filesystem. The particular overlay is chosen based on the trust model, and a preferred trust model is described below. Child processes automatically inherit their parent namespace, unless otherwise specified by the trust model.

Figure 5:
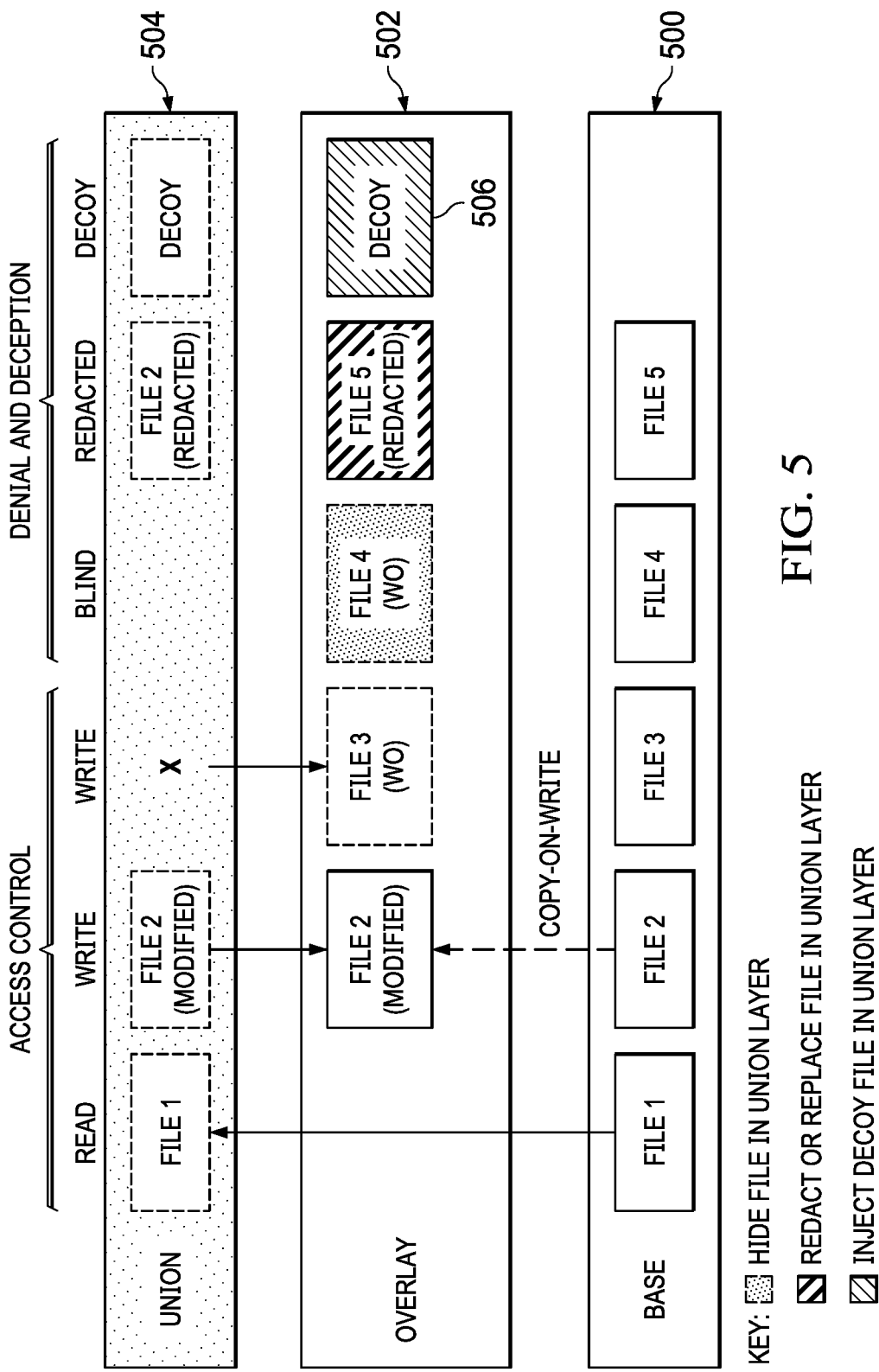
FIG. 5 depicts how the decoy filesystem implements access control, and various denial and deception techniques to protect files in the base filesystem.

Further details of a decoy filesystem implementation are shown in FIG. 5. In this embodiment, the decoy filesystem is implemented using the Linux operating system OverlayFS union filesystem, which creates an upper mount and a lower mount. In this context, the lower mount is the base filesystem, and the upper mount is the overlay. FIG. 5 depicts this concept, showing the base 500 and overlay 502 mounts, and the resulting union 504 of the two mounts that serves as the namespace's pivot. The base filesystem in this example includes a set of base files (file 1 through file 5), and the various protection features provided by the decoy filesystem are shown by of example. Thus, the access control module operation is shown with respect to various read/write operations on base files 1, 2 and 3. Base file 1 is made available in the union for read; base file 2 is stored in the overlay in a modified form such that a write from the union does not impact the base file; and base file 3 is marked as deleted in the overlay so that it cannot be written. The denial and deception function is depicted by example with respect to base files 4 and 5. Thus, base file 4 is hidden in the overlay and thus not available in the union; base file 5 is redacted or replaced in the overlay and thus only made available in the redacted form in the union. An additional decoy file 516 is also provided in the overlay and is thus visible in the union, but this decoy does not correspond to any base file.

Thus, and as these non-limiting examples demonstrate, there are several techniques that are implemented by the decoy filesystem. To hide a base file or directory, the decoy filesystem simply marks it as deleted in the overlay. Decoy files are similarly placed in carefully-chosen locations inside the upper mount, and existing files can be replaced or redacted for attacker deception as previously noted. Changes made by processes determined to be untrusted do not affect the base filesystem, thereby protecting legitimate users from seeing malicious changes as well as effectively keeping an uncorrupted copy of the filesystem immediately before the malicious process started. The decoy filesystem hides particular files and directories from a process, thus curtailing sensitive data leaks. When necessary, the decoy filesystem generates encrypted files and implants decoys in the overlay to replace sensitive files in the base filesystem.

An example Linux implementation uses Ubuntu 16.04 LTS, leveraging VFS (Virtual File System) and its mount namespace implementation. This implementation is advantageous as it provides for a stacking filesystem to augment standard filesystems with the desired denial and deception capabilities (namely, hiding resources from untrusted processes, redacting or replacing assets to protect sensitive data, and injecting breadcrumbs to dis-inform and misdirect attackers). The VFS module enables transparent and easy integration with legacy environments. Further, the filesystem can be easily installed without system restart by using the kernel hot-patch to configure it into the existing production environment. While the above implementation is preferred, it is not intended to be limiting. Recently, Windows Server 2016 was released with native namespace support and an overlay filesystem driver, mirroring its open-source counterpart. The above-described approach may be implemented therein, or other modern operating system environments that support namespace-type constructs.

Figure 6:
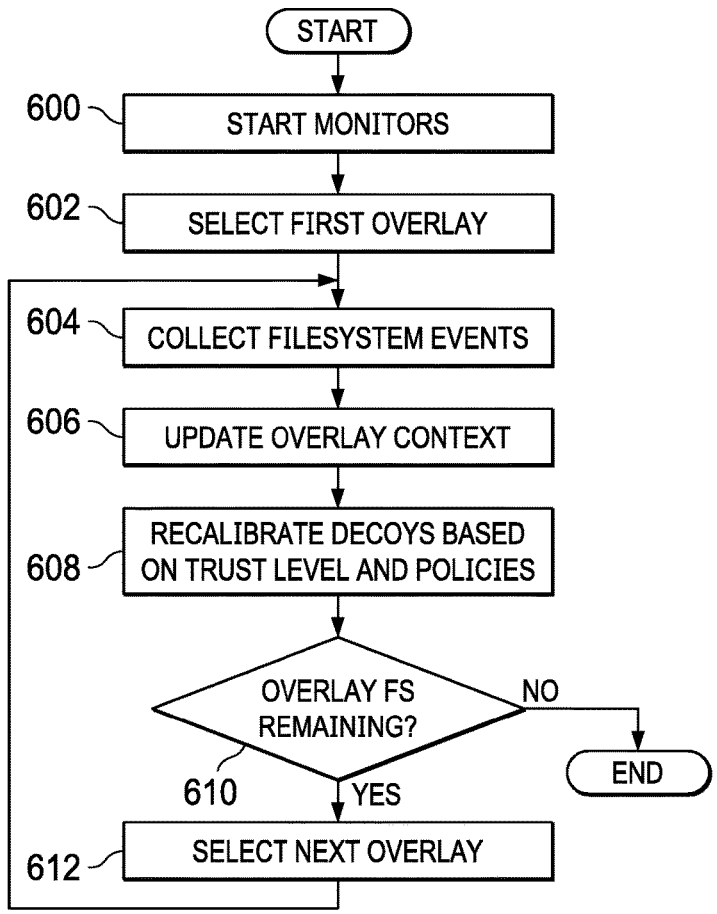
FIG. 6 is a process flow depicting how the decoy filesystem strategically overlays deceptive objects atop the base filesystem.
Figure 7:
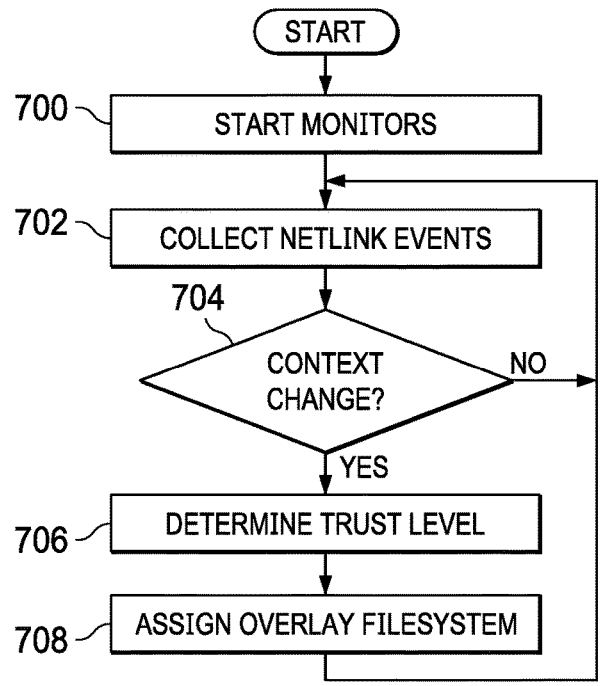
FIG. 7 is a process flow depicting how the decoy filesystem creates a targeted filesystem "view" that is assigned to an overlay.

The various operations of the decoy filesystem may be implemented in software executed in one or more hardware processors, typically as a set of processes. FIGS. 6 and 7 depict several additional control processes that may be used with the system and are now described.

FIG. 6 is a process flow depicting how the decoy filesystem strategically positions deceptive objects (decoys) atop the base filesystem. At step 600, the monitors (one for each overlay) are started. At step 602, a first overlay is selected. Filesystem events are then collected at step 604 for the selected first overlay. At step 606, the routine updates an overlay "context" for the overlay being monitored. At step 608, decoys are then recalibrated (i.e., strategically-positioned) based on the existing trust level and, optionally, one or more policies. At step 610, a test is made to determine whether additional overlays need to be monitored. If so, the routine branches to step 612 to select a next overlay for monitoring. Control then returns to step 604. When all of the overlays have been processed, the outcome of the test at step 610 is negative and the decoy deployment process ends.

FIG. 7 is a process flow depicting how the decoy filesystem creates targeted filesystem "views," e.g., that hide hide-value resources and expose breadcrumbs to detect deliberate tampering with filesystem data. To this end, the decoy filesystem actively captures filesystem events and correlates them with other system features (e.g., user, process name, time, etc.) to create the views. Thus, the process begins at step 700 by starting the monitors. At step 702, netlink events are collected. The netlink socket family is a Linux kernel interface used for inter-process communication (IPC) between both the kernel and user space processes, and between different user space processes. Using the information collected, a test is performed at step 704 to determine whether a context change has occurred. If not, the routine cycles. If, however, the outcome of the test at step 704 indicates a context change, the routine continues at step 706 to determine the trust level. At step 706, a new "view" is created and assigned to an overlay in the decoy filesystem. In an alternative embodiment, a pre-existing view may be used. Control then returns to step 702 to complete the process.

Security Domain Creation/Selection Using a Lattice-Based Trust Model

As has been described, according to this disclosure a decoy filesystem leverages mount namespaces to transparently isolate filesystem views. As previously noted, a namespace is an operating system construct that wraps a global system resource in an abstraction that makes processes inside the namespace appear to have their own isolated instance of a global resource. A mount namespace provides an isolated mount point list for any process inside the namespace; thus, a process inside the namespace has a different view of the filesystem than the base system. According to an aspect of this disclosure, preferably mount namespaces are created on-the-fly for individual processes, or they may be designed for reuse by separate groups of applications. These reusable namespaces as referred to herein as "security domains." FIG. 3 depicts security domains 310 (shown there as the process groups). As will be seen, security domains enforce coherent views of the filesystem while curtailing issues related to file merging. As also previously described, and as depicted in FIG. 4, the filesystem preferably modifies an operating system exec system call to create and move processes, upon creation, into the proper security domain. In a Linux-based implementation, a Linux setns system call may be used for this purpose.

Preferably, each security domain is a stackable filesystem with a base filesystem (FIG. 3, 300, or FIG. 4 400) and an overlay layer (FIG. 3, 306, FIG. 4, 412). As previously described, an overlay prevents untrusted modifications to reach the base filesystem, unless explicitly merged. FIG. 8 depicts a preferred Linux OS-based algorithm that may be used to create a security domain. The algorithm begins with an unshare system call (line 1), which creates and enters a new separate mount namespace from the global mount namespace. Next, a stackable filesystem (specific to an application or user) is created by generating an overlay, and then populating it with decoy files and hidden files (lines 5-7). The overlay and base filesystems are then mounted to a system directory (line 8), and the existing root filesystem is then swapped with the newly-created stackable filesystem using a pivot root system call (lines 9-11) inside the mount namespace. Finally, the old root filesystem is removed (lines 12-13). Once created in this manner, the namespace is persisted using a filesystem mount so that new processes can be placed into the namespace. In this way, a newly-launched process is unaware that it runs on a customized view of the host filesystem.

Figure 9:
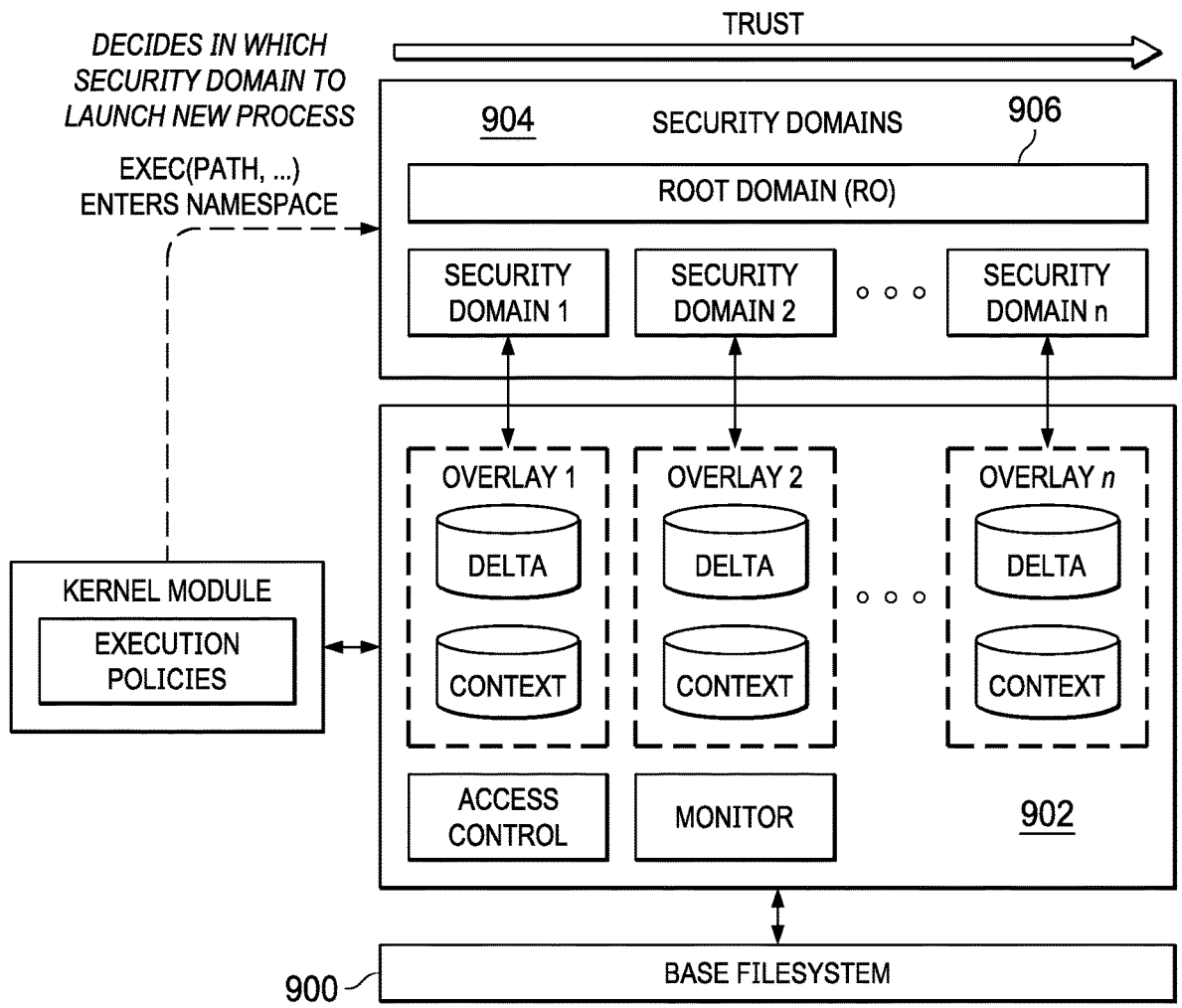
FIG. 9 depicts how the decoy filesystem implements a security domain architecture comprising a root domain, and a set of security domains to protect a base filesystem.

As noted above, in the approach herein processes are moved, upon creation, into a mount namespace, preferably based a trust notion of trust. A preferred technique is now described. Referring to FIG. 9, the architecture comprises the base filesystem 900, the set of overlays 902, and the set of one or more security domains 904 that are provided in the mount namespaces. As noted above, a security domain may be built on-the-fly for individual processes, or it may be designed for reuse by separate groups of applications. The decoy filesystem's security domains enforce coherent views of the filesystem, while curtailing issues related to file merging. As depicted in FIG. 9, the architecture includes a root domain 906, which is a domain that provides a single complete view of the filesystem, thereby enabling transparent filesystem operations (e.g., copying between domains, loading applications, etc.). In particular, the root domain 906 is a union filesystem in which all processes are pivoted by default: root=base (ro) U delta$_1$ . . . U delta$_n$. The root domain provides usability by overcoming merging issues that otherwise arise from the system's ability to separate filesystem views. With the root domain implemented, processes can transparently open files and launch applications in their native security domains to protect the integrity of the filesystem. When multiple overlays share the same fully-quality object path names, object collisions are handled by stacking overlays, preferably according to the trust order relative to each domain. The root domain preferably is implemented as a special mount namespace that fuses together into a single unified view a writable base filesystem mount with all the read-only overlay filesystem mounts from the other security domains. Preferably, the root domain is reserved for a few special programs, such as a file browser, terminal, and file-copying tools, although this is not a limitation. Copying tools can then be used to allow files to be copied or moved between security domains as desired. Each security domain 904 transparently creates multiple levels of stacking to protect the base filesystem 900 and monitor file accesses without incurring a performance overhead.

As noted above, preferably the filesystem specifies an algorithm based on order theory for choosing a proper security domain into which a process or application is placed and run. A preferred approach is now described. As will be seen, the approach is policy-driven, and is preferably defined by security domain associations among mount namespaces, filesystem objects, and users. In order theory, a lattice is a structure that consists of a partially-ordered set in which every two elements have a unique upper bound (or join), and a unique greatest lower bound (or meet). The technique of this disclosure preferably leverages a structure of this type, as will now be described.

Figure 10:
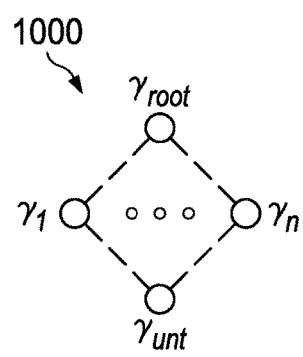
FIG. 10 depicts a representative example of a security domain lattice that is enforced to control into which a set of security domains a newly-launched process is placed according to an aspect of this disclosure.

Preferably, and with reference to FIG. 10, each security domain $\gamma \in (\Gamma, \leq)$ is assigned a rank denoting its level of trust relative to the other security domains. Taking together, the security domains therefore comprise a partially-ordered lattice 1000 ordered by trust scores ($\leq$), with an untrusted domain ($\gamma_{unt}$) at the bottom (denoting untrusted execution), and the root domain ($\gamma_{root}$) at the top (denoting trusted execution). As used herein, a meet operation n denotes greatest lower bound, which as will be seen is used herein to determine an appropriate security domain of execution of new programs (processes, applications, execution threads, etc.) By leveraging a lattice 1000 such as depicted in FIG. 10, the decoy filesystem's view isolation is policy-driven, preferably defined via associations, e.g., between and among mount namespaces, filesystem objects, and users with security domains.

In particular, preferably a decision about which security domain (e.g. 904 in FIG. 9) should be selected to execute a new process extends the semantics of the operating system kernel's exec (filename, args) function to compute a target execution domain as $\gamma_{filename} \Pi \gamma_{args} \Pi \gamma_{user} \Pi \gamma_{ns}$, namely, the meet between the security domains of filename, args (computed across all arguments denoting file paths), $\gamma_{user}$ (the set of security domains associated with a user), and $\gamma_{ns}$ (a parent process security domain, denoted by the current mount namespace). Including $\gamma_{ns}$ in the security domain determination of a newly-launched process caps its execution to its parent process's security domain, thus preventing lower-ranked domains from accidentally or maliciously spawning child processes in higher-ranked domains. In a preferred implementation, this property is seamlessly encoded in the security domains' mount namespace hierarchy.

Figure 11:
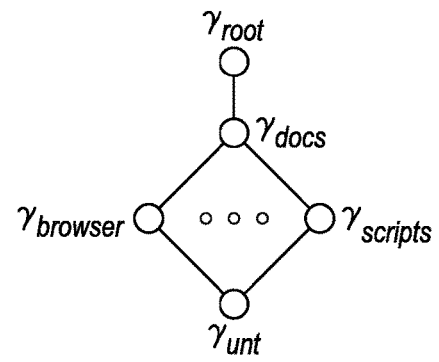
FIG. 11 depicts a specific example of the security domain lattice.
Figure 12:
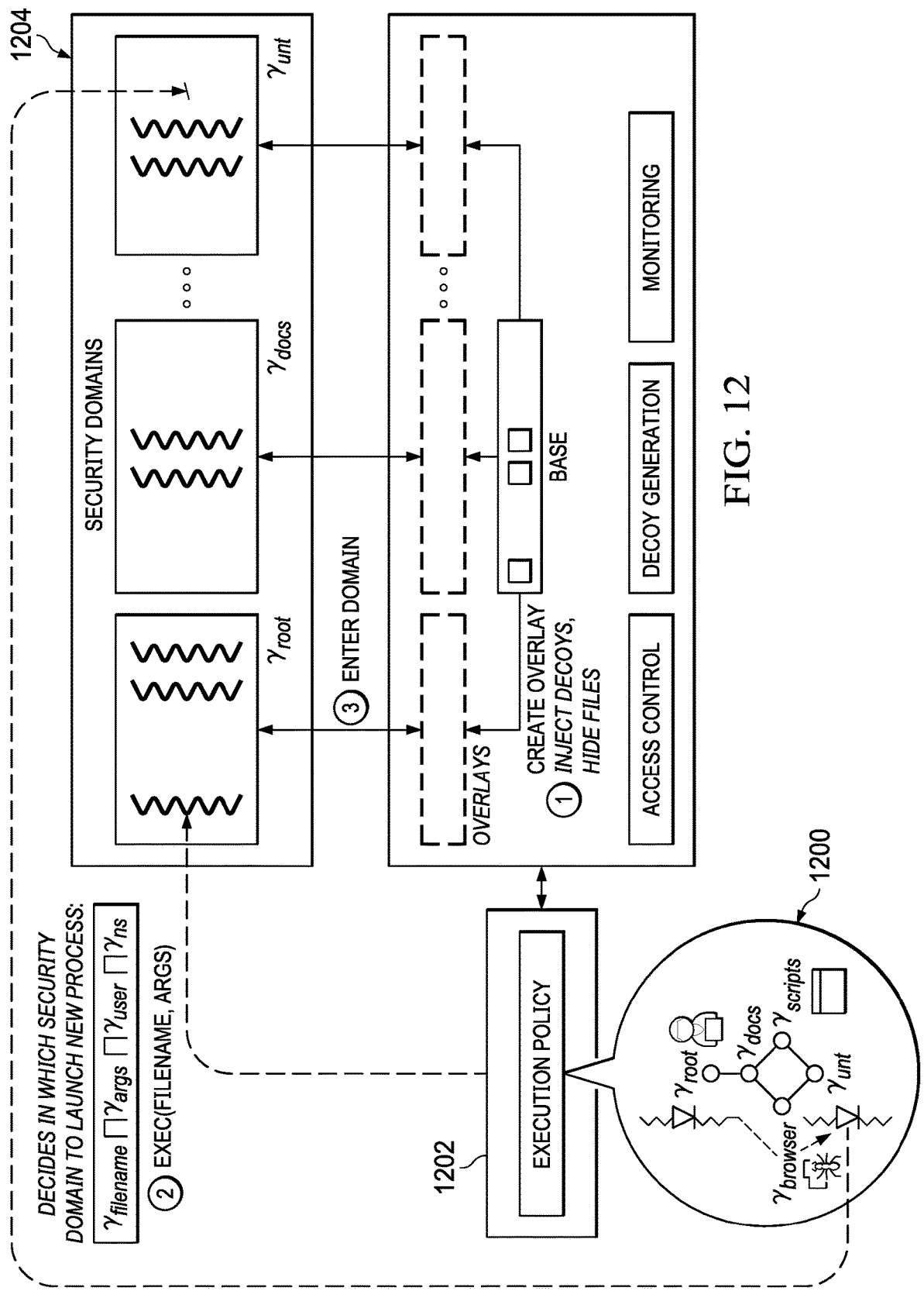
FIG. 12 depicts an operating system kernel execution policy applying the order theory algorithm to determine into which security domain a new process should be launched.

FIG. 11 depicts the above-described target execution security domain selection process for a simple security domain setup, in particular for a client desktop. In this example, which is not intended to be limiting, the model 1100 includes security domains to separate Internet-facing applications ($\gamma_{browser}$), word processing tools ($\gamma_{docs}$), and programming environments for scripted languages ($\gamma_{scripts}$). In this example context, assume a web browser running in $\gamma_{browser}$ downloads a PDF document from the Internet, which document gets stored in the browser domain. To visualize its contents, a trusted user ($\gamma_{root}$) opens the file in a PDF viewer ($\gamma_{docs}$). As a result of enforcing the order theory-based trust model, the decoy filesystem executes a viewer (the process) in the browser domain, namely, the greatest lower bound of the domains involved in the security domain determination, so that the potentially malicious PDF file has no access to the user's documents (kept separated in $\gamma_{docs}$). FIG. 12 depicts the above-described operation, wherein the execution policy 1202 applies the security domain lattice 1200 to thereby locate the viewer process in the untrusted security domain mount namespace 1204.

Similarly, if a process running in $\gamma_{scripts}$ spawns a second process not authorized to execute in the scripts domain, the decoy filesystem moves the sub-process task to the untrusted domain ($\gamma_{unt}$). As can be seen, the above-described approach prevents a trusted process from being exploited to install and launch untrusted malware. The rule also prevents malware from gaining entry to another security domain by running trusted applications.

Preferably, each security domain preferably has its own profile, which contains the list of files and directories that are viewable within the domain. These include files that are deleted, replaced, or injected in the domain view. The profile preferably also has a list of the directories that are bind-mounted to the base filesystem. Such directories preferably are not subject to an overlay and can be directly written. Directories such as the system logs, or a browser's download, might be bind-mounted to facilitate easy file sharing across domains. In addition to domain profiles, the decoy filesystem preferably also supports application and user profiles that govern domain access. Each profile contains the subject or subjects of the profile, which include user names, binary names, and binary hashes. The profile also contains a list of the domains for which the subject has access, along with a default security domain when an application is run without an open file. Preferably, any subject not listed in a profile is designated to the untrusted domain.

Preferably, security domains such as described above are built hierarchically, taking the same structure as the lattice that describes them. This hierarchical organization preferably is created by nesting mount namespaces via recursive invocations of the unshare system call, starting with the root domain, followed by the domains in the next level of the lattice, and so forth. Individual security domains are constructed as described in accordance with the algorithm depicted in FIG. 8. Because the untrusted domain is the leaf namespace of the structure, it must be created in each of the (leaf-1)-level domains and bind-mounted to the same overlay. Mount namespaces preferably have the desired property that running processes can only be moved into namespaces down the nested hierarchy. This ensures that a process cannot break the policy enforced by the lattice.

Figure 13:
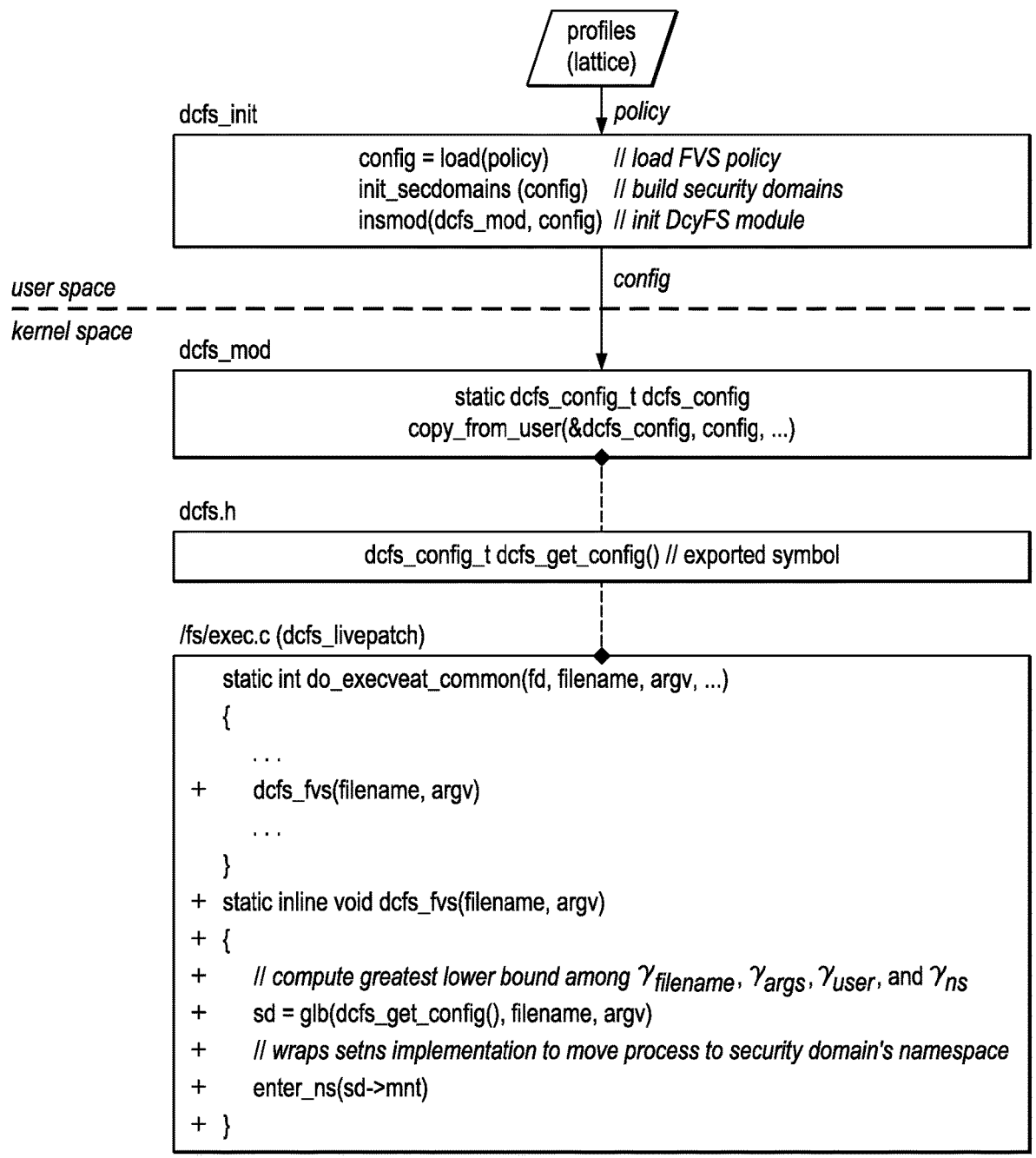
FIG. 13 depicts a representative kernel modification that implement a security domain hierarchy and enforcement procedure of this disclosure.

FIG. 13 shows a simplified view of a set of kernel modifications that implement the security domains hierarchy and enforcement procedure of this disclosure with respect to a Linux-based implementation. Upon initialization, a bootstrap component (dcfs_init) ingests pre-defined subject and filesystem view separation (FVS) profiles—denoting the partially-ordered lattice of security domains—into a config object, which is used to create the security domains and load the kernel module tasked with maintaining the FVS policies. At runtime, dcfs_livepatch uses kpatch to modify the kernel's do_execveat_common function to call dcfs_fvs, which implements the decision procedure to move newly-created processes to their appropriate security domains.

The decoy filesystem provides data integrity, preferably by strictly enforcing that all writes are made to the overlay layer. Writes to base files are first copied up to the overlay layer before being written using copy-on-write. This has the desirable effect of preserving the base filesystem, such that changes made by untrusted processes do not affect the base, protecting legitimate users from seeing malicious changes as well as effectively keeping a pristine copy of the filesystem immediately before the malicious process started. The decoy filesystem hides particular files and directories from the process, thus curtailing sensitive data leaks. Additionally, the filesystem generates encrypted files and implants decoys in the overlay to shadow sensitive files in the base filesystem. The decoy filesystem also transparently monitors and logs access to such files. Moreover, only the untrusted process is affected by the hidden and decoy files, leaving legitimate users free of confusion.

Trusted processes also benefit from security domains. In particular, the decoy filesystem can launch a trusted process atop an overlay to hide unnecessary files and directories, or inject decoys to catch potential insiders. Furthermore, certain directories can be bind-mounted from the base filesystem to give trusted processes the ability to directly view and modify them. For example, an operator might run a database server, providing it with a fake overlay view of the entire filesystem, but giving it direct write access to the directories in which it writes data. As a result, if the database application is compromised, damage is limited to the data directory only.

As can be seen, the decoy filesystem described herein leverages the overlay infrastructure to conceal its existence from attackers and curtail access to explicit information about its kernel modules, configuration objects, and overlay mounts. Preferably, this is achieved by bootstrapping the filesystem with configuration rules that hide and redact specific filesystem objects. For example, /proc/mounts (/proc/self/mount*) and/etc/mtab are redacted to conceal overlay mount point information and bind mounts into the overlays, and the decoy filesystem's kernel live patch and kernel module are hidden from filesystem views. Similarly, the filesystem hides its configuration, user mode helper components (e.g., decoy generation, configuration parsing, forensics data extraction), and working directory where overlays and logs are persisted in the base filesystem.

Security domains as described herein preferably are configured using standard policies inside an operating system to mitigate manual user configuration. More generally, the system automates the creation of a trust model using different notions of trust (e.g., policy-, reputation-, and game-theoretic based). A trust model may also take into account other information to determine user trustworthiness, such as (1) the identity of the user executing the program, (2) mode of authentication (e.g., remote, local), and (3) past user interactions with the filesystem. The model also may be influenced by other factors, such as process origin, entry point, popularity, and reputation. Default policies may be attached to software installed from various sources (e.g., app stores), or repositories such as Linux's apt. In one example implementation, an operating system is provided with default security domains and application lists (e.g., similar to how SELinux policies are shipped with Linux). These policies may be customized by the user to meet special requirements or security needs. For example, companies often discourage employees from installing unauthorized applications on their work computers. Using security domains, a company can set up default policies to separate filesystem views for company-approved applications versus those installed by the employee.

While the above-described security domain hierarchy utilizes a partially-ordered set lattice, other order theory-based techniques may be used. For example, and without loss of generality, the above-described technique may use preorders, Hasse diagrams, bounded posets, or the like, to formalize the security domain hierarchy, and to derive algorithms to determine in which domain to execute newly-launched processes.

The subject matter herein provides significant advantages. As described, the approach herein provides a stackable filesystem architecture that curtails data theft and ensures file integrity protection, preferably by grouping applications into ranked filesystem views (namely, the security domains). By combining its layered architecture with view separation via security domains, the filesystem maintains data integrity and confidentiality without affecting how the underlying filesystem is used. The filesystem also stops malware from making system-level changes, such as persisting across reboots or creating hidden users, regardless of privilege. The techniques herein are simple to implement. A simple deployment model involves providing an operating system with a set of security domains.

The techniques herein provide additional advantages of enabling transparent access to the filesystem while ensuring data integrity and confidentiality, non-disruption of normal use of the filesystem, and no additional read or write overheads. The technique also conceptualizes a trust paradigm for filesystem segmentation schemes.

The decoy filesystem technique stops theft, prevents modification or destruction of important data by untrusted subjects, (e.g., applications, users, etc.), deceives adversaries, and detects the presence of attackers on production systems. It provides for a new filesystem paradigm that protects files effectively at their place of rest. The solution provides a decoy filesystem that monitors file accesses transparently, hides sensitive data, creates decoy files, and modifies existing files to provide to untrusted subjects (e.g., processes and users) a fake system view. The filesystem actively captures filesystem events and correlates them with other system features (e.g., user, process name, time) to create targeted filesystem views that hide high-value assets and expose enticing breadcrumbs to detect deliberate tampering with filesystem data. Such context-awareness minimizes false alarms by curtailing inadvertent, legitimate access to breadcrumbs, by exposing more "truthful" views of the filesystem to trustworthy processes, all the while maximizing chances of attack detection by strategically overlaying deceptive objects atop the base filesystem.

The approach detects and resists real ransomware attacks, and it defends against data theft and filesystem tampering without incurring significant overhead. The approach enforces file integrity protection without requiring file access mediation. It also supports the implementation of access control policies, and it enables the automation of decoy injection in commodity filesystems.

In addition, the approach enables the construction of realistic, but completely false, views of the filesystem to be presented to untrusted processes. To a process running in an overlay, it appears that it is able to view, extract, and modify real data. It may be viewing decoy files or missing sensitive files, however, and its file modifications will not be seen outside its overlay. As has been described, this operation is done transparently, without advertising itself to the untrusted process, and without affecting other legitimate processes. Further, and to make decoy files both less visible to trusted users and more visible to attackers, the decoy filesystem actively moves decoys into place for untrusted programs. This means that decoys can be stored out of the way of trusted users (e.g., in a hidden directory), as well as being visible in normal locations for untrusted programs.

Preferably, and as described above, the changes made by untrusted processes are currently only visible to that process and disappear on reboot. In situations where an untrusted process should become trusted, such as being vouched for by a more-trusted subject, those changes may be copied from the overlay and merged into the real filesystem. Further, the approach herein supports decoy files that are created manually. As another variant, the decoy filesystem may create decoy files automatically based on different formats, such as data that appears to be encrypted, or files containing fake keys or passwords. The system may also be configured to learn the content of overlays based on past process behaviors to streamline overlay generation.

As has been described, the approach herein preferably is implemented as an overlay to an existing filesystem, and thus there is no need to have access to the actual filesystem itself. As noted, the technique instead leverages the notion of a filesystem namespace to implement the decoy filesystem, and these types of namespaces are available in modern operating systems such as Linux, Windows Server 2016, and the like. Further, by using a kernel module to hook in and make decisions on where (i.e., which namespace) to place a newly-forked process (e.g., based on trust), the approach may be used with any such operating system, even without access to the actual operating system source code.

The techniques herein may be used with a host machine such as shown in FIG. 2 (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

As previously noted, the above-described components typically are each implemented as software, i.e., as a set of computer program instructions executed in one or more hardware processors. As has been described, the components are shown as distinct, but as noted this is not a requirement, as the components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates the above-described infrastructure. It may be available as a managed service, e.g., provided by a cloud service.

The components may implement any process flow (or operations thereof) synchronously or asynchronously, continuously and/or periodically.

The approach may be integrated with other enterprise- or network-based security methods and systems, such as in a SIEM, or the like.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Aspects of this disclosure may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, system is implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While a process flow above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The nomenclature used herein also should not be taken to be limiting.

The techniques improve conventional computing systems by providing a filesystem that curtails data theft and ensures file integrity protection through deception. Existing computing technologies are improved by providing a decoy filesystem that monitors file accesses transparently, hides sensitive data, creates decoy files, and modifies existing files to provide to untrusted subjects (e.g., processes and users) a fake system view. Computing systems that incorporate the techniques herein provide these advantages transparently and without disruption, thereby increasing the reliability and availability of the underlying filesystem. Further, computer systems implemented with the approach herein operate more efficiently and with less cyber security-specific processing and storage requirements than they would otherwise.

The security domain technique herein is not limited to use in a filesystem architecture that leverages mount namespaces and the overlay filesystem. In particular, the technique of providing an order theory-based security domain hierarchy, and then enforcing trust using that hierarchy may be applied in other access control mechanisms.

Having described the invention, what we claim is as follows:

1. A method to enforce view separation in a filesystem comprising one or more read-only filesystem overlays deployed on top of a writable base filesystem, comprising:
    associating a set of security domains according to a trust hierarchy that is order theory-based, wherein each security domain has a rank representing a trust level relative to one or more other of the security domains, wherein a security domain comprises a profile, wherein a profile includes a list of files and directories that are viewable within the security domain;
    responsive to a request to the base filesystem to execute a process, applying a computation that is order theory-based to the trust hierarchy to select a target security domain in which the process should execute; and
    based on the computation, launching the process in the target security domain.

2. The method as described in claim 1 further including preventing the process from executing any child process in a security domain higher than any parent security domain of the target security domain.

3. The method as described in claim 1 wherein the trust hierarchy is a partially-ordered set lattice, wherein the lattice is structured with an untrusted domain representing untrusted execution at a bottom, and a root domain denoting trusted execution at a top.

4. The method as described in claim 3 wherein the computation computes the target security domain as $\gamma_{filename}\Pi\gamma_{args}\Pi\gamma_{user}\Pi\gamma_{ns}$, namely, a meet between a filename security domain, a file path security domain computed across all arguments denoting file paths, a security domain associated with a user, and a parent process security domain denoted by a current mount namespace.

5. The method as described in claim 4 wherein the meet enforces a greatest lower bound among the set of security domains.

6. The method as described in claim 1 wherein the filesystem further includes a root domain that fuses together in a unified view the base filesystem with all of the read-only filesystem overlays.

7. An apparatus, comprising:
a processor;
computer memory holding computer program instructions executed by the processor, the computer program instructions configured to enforce view separation in a filesystem comprising one or more read-only filesystem overlays deployed on top of a writable base filesystem, the computer program instructions comprising program code configured to:
associate a set of security domains according to a trust hierarchy that is order theory-based, wherein each security domain has a rank representing a trust level relative to one or more other of the security domains, wherein a security domain comprises a profile, wherein a profile includes a list of files and directories that are viewable within the security domain;
responsive to a request to the base filesystem to execute a process, apply a computation that is order theory-based to the trust hierarchy to select a target security domain in which the process should execute; and
based on the computation, launch the process in the target security domain.

8. The apparatus as described in claim 7 wherein the program code is further configured to prevent the process from executing any child process in a security domain higher than any parent security domain of the target security domain.

9. The apparatus as described in claim 7 wherein the trust hierarchy is a partially-ordered set lattice, wherein the lattice is structured with an untrusted domain representing untrusted execution at a bottom, and a root domain denoting trusted execution at a top.

10. The apparatus as described in claim 9 wherein the computation computes the target security domain as $\gamma_{filename}\Pi\gamma_{args}\Pi\gamma_{user}\Pi\gamma_{ns}$, namely, a meet between a filename security domain, a file path security domain computed across all arguments denoting file paths, a security domain associated with a user, and a parent process security domain denoted by a current mount namespace.

11. The apparatus as described in claim 10 wherein the meet enforces a greatest lower bound among the set of security domains.

12. The apparatus as described in claim 7 wherein the filesystem further includes a root domain that fuses together in a unified view the base filesystem with all of the read-only filesystem overlays.

13. A computer program product in a non-transitory computer readable medium, the computer program product holding computer program instructions to enforce view separation in a filesystem comprising one or more read-only filesystem overlays deployed on top of a writable base filesystem, the computer program instructions comprising program code configured to:
associate a set of security domains according to a trust hierarchy that is order theory-based, wherein each security domain has a rank representing a trust level relative to one or more other of the security domains, wherein a security domain comprises a profile, wherein a profile includes a list of files and directories that are viewable within the security domain;
responsive to a request to the base filesystem to execute a process, apply a computation that is order theory-based to the trust hierarchy to select a target security domain in which the process should execute; and
based on the computation, launch the process in the target security domain.

14. The computer program product as described in claim 13 wherein the program code is further configured to prevent the process from executing any child process in a security domain higher than any parent security domain of the target security domain.

15. The computer program product as described in claim 13 wherein the trust hierarchy is a partially-ordered set lattice, wherein the lattice is structured with an untrusted domain representing untrusted execution at a bottom, and a root domain denoting trusted execution at a top.

16. The computer program product as described in claim 15 wherein the computation computes the target security domain as $\gamma_{filename}\Pi\gamma_{args}\Pi\gamma_{user}\Pi\gamma_{ns}$, namely, a meet between a filename security domain, a file path security domain computed across all arguments denoting file paths, a security domain associated with a user, and a parent process security domain denoted by a current mount namespace.

17. The computer program product as described in claim 16 wherein the meet enforces a greatest lower bound among the set of security domains.

18. The computer program product as described in claim 13 wherein the filesystem further includes a root domain that fuses together in a unified view the base filesystem with all of the read-only filesystem overlays.

19. A method to enforce view separation in a filesystem comprising one or more read-only filesystem overlays deployed on top of a writable base filesystem, comprising:
associating a set of security domains according to a trust hierarchy that is order theory-based, wherein each security domain has a rank representing a trust level relative to one or more other of the security domains;
responsive to a request to the base filesystem to execute a process, applying a computation that is order theory-based to the trust hierarchy to select a target security domain in which the process should execute; and
based on the computation, launching the process in the target security domain;
wherein the trust hierarchy is a partially-ordered set lattice, wherein the lattice is structured with an untrusted domain representing untrusted execution at a bottom, and a root domain denoting trusted execution at a top.

20. An apparatus, comprising:
a processor;
computer memory holding computer program instructions executed by the processor, the computer program instructions configured to enforce view separation in a filesystem comprising one or more read-only filesystem overlays deployed on top of a writable base filesystem, the computer program instructions comprising program code configured to:
associate a set of security domains according to a trust hierarchy that is order theory-based, wherein each security domain has a rank representing a trust level relative to one or more other of the security domains;

responsive to a request to the base filesystem to execute a process, apply a computation that is order theory-based to the trust hierarchy to select a target security domain in which the process should execute; and based on the computation, launch the process in the target security domain;

wherein the trust hierarchy is a partially-ordered set lattice, wherein the lattice is structured with an untrusted domain representing untrusted execution at a bottom, and a root domain denoting trusted execution at a top.

21. A computer program product in a non-transitory computer readable medium, the computer program product holding computer program instructions to enforce view separation in a filesystem comprising one or more read-only filesystem overlays deployed on top of a writable base filesystem, the computer program instructions comprising program code configured to:

associate a set of security domains according to a trust hierarchy that is order theory-based, wherein each security domain has a rank representing a trust level relative to one or more other of the security domains;

responsive to a request to the base filesystem to execute a process, apply a computation that is order theory-based to the trust hierarchy to select a target security domain in which the process should execute; and based on the computation, launch the process in the target security domain;

wherein the trust hierarchy is a partially-ordered set lattice, wherein the lattice is structured with an untrusted domain representing untrusted execution at a bottom, and a root domain denoting trusted execution at a top.

* * * * *